United States Patent
Suzuki et al.

(10) Patent No.: US 11,421,630 B2
(45) Date of Patent: Aug. 23, 2022

(54) GAS-LIQUID SEPARATOR

(71) Applicants: USUI CO., LTD., Shizuoka (JP); TOYOTA JIDOSHA KABUSHIKI KAISHA, Aichi-ken (JP)

(72) Inventors: Tetsunobu Suzuki, Shizuoka (JP); Hidetaka Ito, Shizuoka (JP)

(73) Assignees: USUI CO., LTD., Shizuoka (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 352 days.

(21) Appl. No.: 16/758,688

(22) PCT Filed: Oct. 17, 2018

(86) PCT No.: PCT/JP2018/038733
§ 371 (c)(1),
(2) Date: Apr. 23, 2020

(87) PCT Pub. No.: WO2019/082773
PCT Pub. Date: May 2, 2019

(65) Prior Publication Data
US 2020/0370517 A1    Nov. 26, 2020

(30) Foreign Application Priority Data
Oct. 25, 2017    (JP) .............................. JP2017-206577

(51) Int. Cl.
*F02M 26/06* (2016.01)
*F02M 26/05* (2016.01)
(Continued)

(52) U.S. Cl.
CPC ............ *F02M 26/06* (2016.02); *F02M 26/05* (2016.02); *F02M 26/15* (2016.02); *F02M 26/35* (2016.02);
(Continued)

(58) Field of Classification Search
CPC ........ F02M 26/06; F02M 26/05; F02M 26/15; F02M 26/35; F02M 35/10059;
(Continued)

(56) References Cited

U.S. PATENT DOCUMENTS

| | | | | |
|---|---|---|---|---|
| 4,092,137 A | * | 5/1978 | Howe | ..................... B01D 50/00 |
| | | | | 128/205.12 |
| 6,427,671 B1 | * | 8/2002 | Holze | .................... F02M 26/05 |
| | | | | 137/561 A |

(Continued)

FOREIGN PATENT DOCUMENTS

| | | |
|---|---|---|
| CN | 103201494 | 7/2013 |
| CN | 105697133 | 6/2016 |

(Continued)

OTHER PUBLICATIONS

International Search Report dated Dec. 18, 2018 in International (PCT) Application No. PCT/JP2018/038733.
(Continued)

*Primary Examiner* — Sizo B Vilakazi
(74) *Attorney, Agent, or Firm* — Wenderoth, Lind & Ponack, L.L.P.

(57) ABSTRACT

A gas-liquid separator includes a cylindrical inlet pipe and a fluid inflow pipe. The inlet pipe includes a fluid inlet which is formed in a fluid entering side and radially opens. An axis line of the inlet pipe horizontally extends. The fluid inflow pipe includes at an end a connection opening connected to the fluid inlet. An axis line of the fluid inflow pipe horizontally extends. The fluid inflow pipe introduces the gas-liquid two-phase fluid through the fluid inlet from a side of the inlet pipe. In a connecting portion, a position of an axis line extending through a center of a connection opening in communication with the fluid inlet is vertically offset with respect to a position of the axis line of the inlet pipe.

9 Claims, 8 Drawing Sheets

(51) Int. Cl.
  *F02M 26/35* (2016.01)
  *F02M 26/15* (2016.01)
  *F02M 35/10* (2006.01)

(52) U.S. Cl.
  CPC . *F02M 35/10059* (2013.01); *F02M 35/10268* (2013.01)

(58) Field of Classification Search
  CPC ............ F02M 35/10268; F02M 26/19; F02M 35/10262; F02M 35/10222; F02M 26/50; B01D 45/16; F02B 29/0468; Y02T 10/12
  See application file for complete search history.

(56) References Cited

U.S. PATENT DOCUMENTS

| | | | |
|---|---|---|---|
| 2004/0079079 A1* | 4/2004 | Martin | F02B 29/0406 60/605.2 |
| 2009/0071150 A1* | 3/2009 | Joergl | F02M 26/19 60/605.2 |
| 2010/0205949 A1 | 8/2010 | Bolda et al. | |
| 2013/0283788 A1* | 10/2013 | Kobayashi | F02M 35/10222 60/605.2 |
| 2016/0169165 A1* | 6/2016 | Isogai | F02B 33/44 60/605.2 |
| 2017/0030305 A1* | 2/2017 | Sugiyama | F02B 47/08 |
| 2018/0361289 A1* | 12/2018 | Suzuki | B04C 3/06 |
| 2018/0361290 A1 | 12/2018 | Suzuki et al. | |

FOREIGN PATENT DOCUMENTS

| | | |
|---|---|---|
| CN | 105829687 | 8/2016 |
| CN | 108697958 | 10/2018 |
| DE | 100 42 247 | 3/2002 |
| DE | 20 2007 005 986 | 10/2008 |
| EP | 3 391 952 | 10/2018 |
| JP | 59-203860 | 11/1984 |
| JP | 9-220421 | 8/1997 |
| JP | 9-303213 | 11/1997 |
| JP | 2010-525231 | 7/2010 |
| JP | 2013-238144 | 11/2013 |
| JP | 2016-31042 | 3/2016 |
| JP | 2016-205321 | 12/2016 |
| JP | WO2017/104531 | 6/2017 |
| SE | 522 759 | 3/2004 |
| WO | 2008/129076 | 10/2008 |
| WO | 2012/066979 | 5/2012 |
| WO | 2016/132570 | 8/2016 |
| WO | 2016/186108 | 11/2016 |
| WO | 2017/104183 | 6/2017 |
| WO | 2017/104184 | 6/2017 |
| WO | 2017/104532 | 6/2017 |

OTHER PUBLICATIONS

Office Action dated Nov. 12, 2021 in corresponding Indian Patent Application No. 202017017134.
Extended European Search Report dated May 3, 2021, in European Application No. 18871705.2.
Office Action dated Jul. 1, 2021 in corresponding Chinese Patent Application No. 201880068062.2, with partial English translation.

* cited by examiner

GAS-LIQUID SEPARATOR

CROSS REFERENCE TO RELATED APPLICATION

This application is based upon and claims the benefit of priority from Japanese Patent Application No. 2017-206577 filed on Oct. 25, 2017, the entire disclosure of which is incorporated herein by reference.

TECHNICAL FIELD

The present disclosure relates to a gas-liquid separator that separates a gas-liquid two-phase fluid into a gas and a liquid.

BACKGROUND ART

Conventionally, a gas-liquid separator that separates a gas-liquid two-phase fluid into a gas and a liquid is known in the art. In such a gas-liquid separator, the gas-liquid two-phase fluid is tangentially introduced into an inlet pipe and swirls within the inlet pipe to be separated into the gas and the liquid (see Patent Literature 1: JPH09-220421A, for example). In the gas-liquid separator, the inlet pipe is disposed such that an axis of the inlet pipe is perpendicular to an axis of a fluid inflow pipe. Thereby, the gas-liquid two-phase fluid is introduced into the inlet pipe from a side thereof.

CITATION LIST

Patent Literature

SUMMARY

In the conventional gas-liquid separator, the axis line of the inlet pipe vertically extends and a top portion of the inlet pipe is coaxially connected to an inner pipe through which the gas flows. The inlet pipe includes a drain port at a bottom thereof. On the other hand, the axis line of the fluid inflow pipe horizontally extends and the fluid inflow pipe is connected to an upper circumferential surface of the inlet pipe. Accordingly, not all of the inlet pipe, the inner pipe, and the fluid inflow pipe are disposed to extend horizontally.

Further, in the conventional gas-liquid separator, a connection portion relative to the fluid inflow pipe is located close to an exhaust port and opens at a position to face the circumferential surface of the inner pipe. Consequently, it would be difficult to properly swirl the gas-liquid two-phase fluid to separate the fluid into the gas and the liquid if all of the inlet pipe, the inner pipe, and the fluid inflow pipe are horizontally disposed.

Considering the above issue, an object of the present disclosure is to provide a gas-liquid separator that properly swirls the gas-liquid two-phase fluid within the horizontally extending inlet pipe.

To achieve the above object, the present disclosure is a gas-liquid separator for separating a liquid and a gas from a gas-liquid two-phase fluid by swirling the gas-liquid two-phase fluid. The gas-liquid separator includes an inlet pipe which horizontally extends. The inlet pipe includes a fluid inlet on a circumference surface upstream in a flow direction of the gas-liquid two-phase fluid; and a drain port formed at an end portion downstream in the flow direction of the gas-liquid two-phase fluid, the liquid exiting through the drain port. The gas-liquid separator includes an inner pipe which includes an opening at an end. The end of the inner pipe is inserted into the end portion of the inlet pipe downstream in the flow direction of the gas-liquid two-phase fluid. The inner pipe is coaxial with the inlet pipe. The gas-liquid separator includes a fluid inflow pipe which horizontally extends. The fluid inflow pipe includes a connecting portion connected to the fluid inlet at an end thereof. The fluid inflow pipe is configured to supply the gas-liquid two-phase fluid into the inlet pipe through the fluid inlet from a side of the inlet pipe. The connecting portion comprises a connection opening in communication with the fluid inlet. A position of an axis line extending through a center of the connection opening is vertically offset with respect to a position of an axis line of the inlet pipe.

DETAILED DESCRIPTION

Hereinafter, an embodiment of a gas-liquid separator according to the present disclosure will be described in accordance with a first embodiment illustrated in the accompanying drawings.

First Embodiment

The configuration of a gas-liquid separator according to the first embodiment will be separately described under headings "Overall Configuration of System" and "Configuration of Gas-Liquid Separator".

Figure 1:
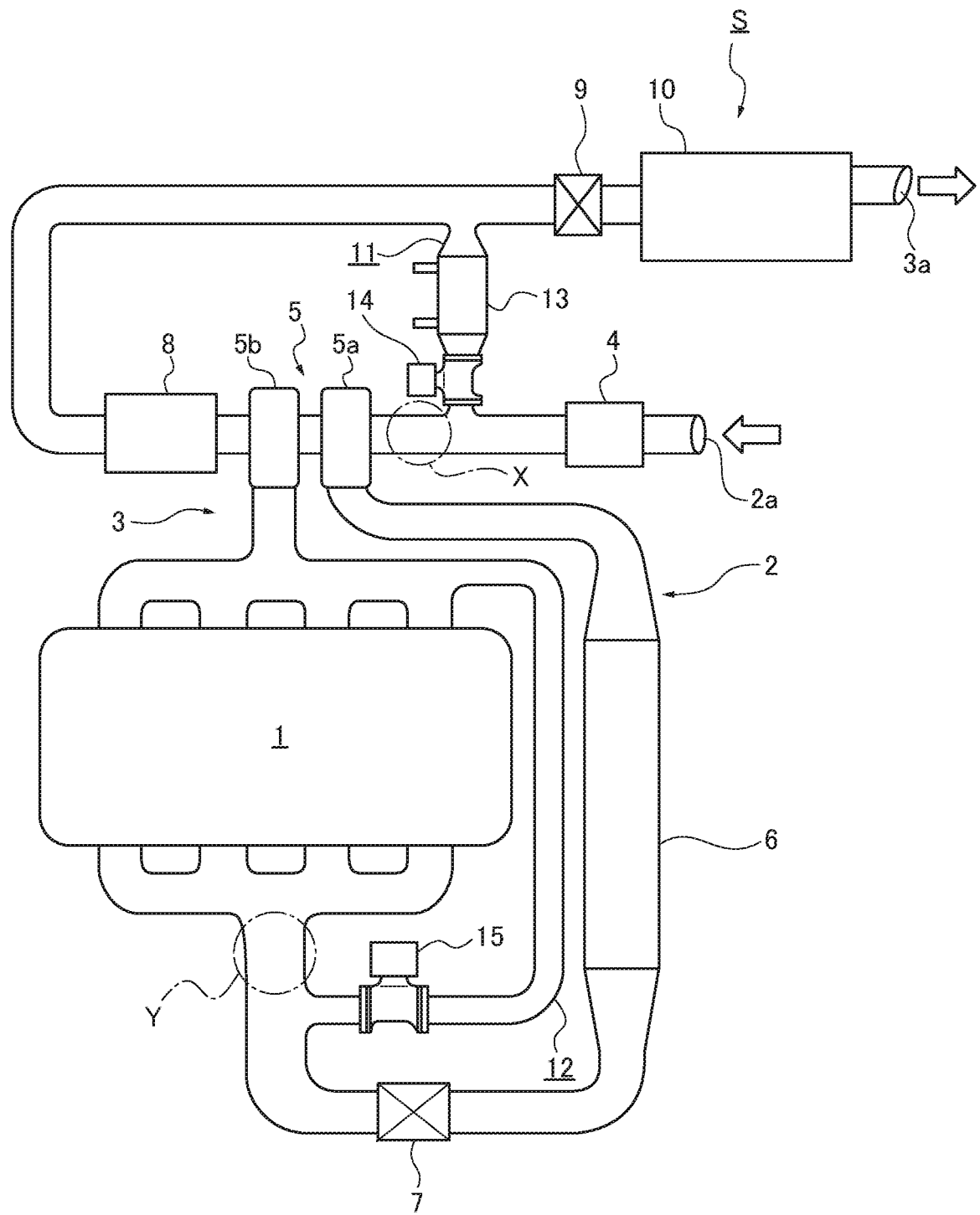
FIG. 1 is a view entirely illustrating an exhaust gas recirculation system of an internal combustion engine to which a gas-liquid separator according to a first embodiment is applied.

(Overall Configuration of System) FIG. 1 is a view entirely illustrating an exhaust gas recirculation system of an internal combustion engine to which a gas-liquid separator according to the first embodiment is applied. Hereinafter, an overall configuration of the system in the first embodiment will be described with reference to FIG. 1.

The gas-liquid separator 20 in the first embodiment is applied to an exhaust gas recirculation system S of an internal combustion engine 1 shown in FIG. 1. The internal combustion engine 1 shown in FIG. 1 is a diesel engine mounted in a vehicle as a driving source for traveling and includes four cylinders (not shown). The cylinders are connected to an intake passage 2 and an exhaust passage 3.

The intake passage 2 includes an intake port 2a at an end. In order from the intake port 2a to the internal combustion engine 1, the intake passage 2 is provided with an air cleaner 4 for filtering an intake air, a compressor 5a of a turbocharger 5, an intercooler 6 for cooling the intake air, and a throttle valve 7 for regulating an amount of the intake air. In order from the internal combustion engine 1, the exhaust passage 3 is provided with a turbine 5b of the turbocharger 5, an exhaust purification catalyst 8 for purifying exhaust gas, and an exhaust throttle valve 9 for regulating an amount of the exhaust gas. A muffler 10 is disposed downstream of the exhaust throttle valve 9, and an exhaust port 3a is disposed downstream of the muffler 10.

The intake passage 2 is connected to the exhaust passage 3 via a low-pressure EGR passage 11 and a high-pressure EGR passage 12. Here, "EGR (Exhaust Gas Recirculation)" is a technology for recirculating a portion of the exhaust gas after combustion in the internal combustion engine 1 back to the intake passage. "EGR" is also referred to as exhaust gas recirculation.

The low-pressure EGR passage 11 connects a portion of the intake passage 2 located upstream of the compressor 5a and a portion of the exhaust passage 3 located downstream of the exhaust purification catalyst 8. On the other hand, the high-pressure EGR passage 12 connects a portion of the intake passage 2 located downstream of the compressor 5a and a portion of the exhaust passage 3 located upstream of the turbine 5b. Thereby, the low-pressure EGR passage 11 returns the exhaust gas passing through the turbine 5b to the intake air before the compressor 5a. Further, the high-pressure EGR passage 12 returns the exhaust gas before flowing into the turbine 5b to the intake air passing through the compressor 5a.

The low-pressure EGR passage 11 includes an EGR cooler 13 for cooling the exhaust gas returning to the intake passage 2, and a low-pressure EGR valve 14 for regulating an amount of the exhaust gas returning to the intake passage 2 via the low-pressure EGR passage 11. The high-pressure EGR passage 12 includes a high-pressure EGR valve 15 for regulating an amount of the exhaust gas returning to the intake passage 2 via the high-pressure EGR passage 12.

The low-pressure EGR passage 11 can return the exhaust gas without reducing the amount of the exhaust gas passing through the turbocharger 5 and can effectively reduce NOx. However, the cooling in the EGR cooler 13 brings an issue of concern to generate condensed water. Therefore, in the first embodiment, the gas-liquid separator 20 (see FIG. 2) is provided downstream of the low-pressure EGR valve 14 and upstream of the compressor 5a of the turbocharger 5 (i.e. at a location surrounded by a dashed line X in FIG. 1) to collect and drain the condensed water.

Figure 2:
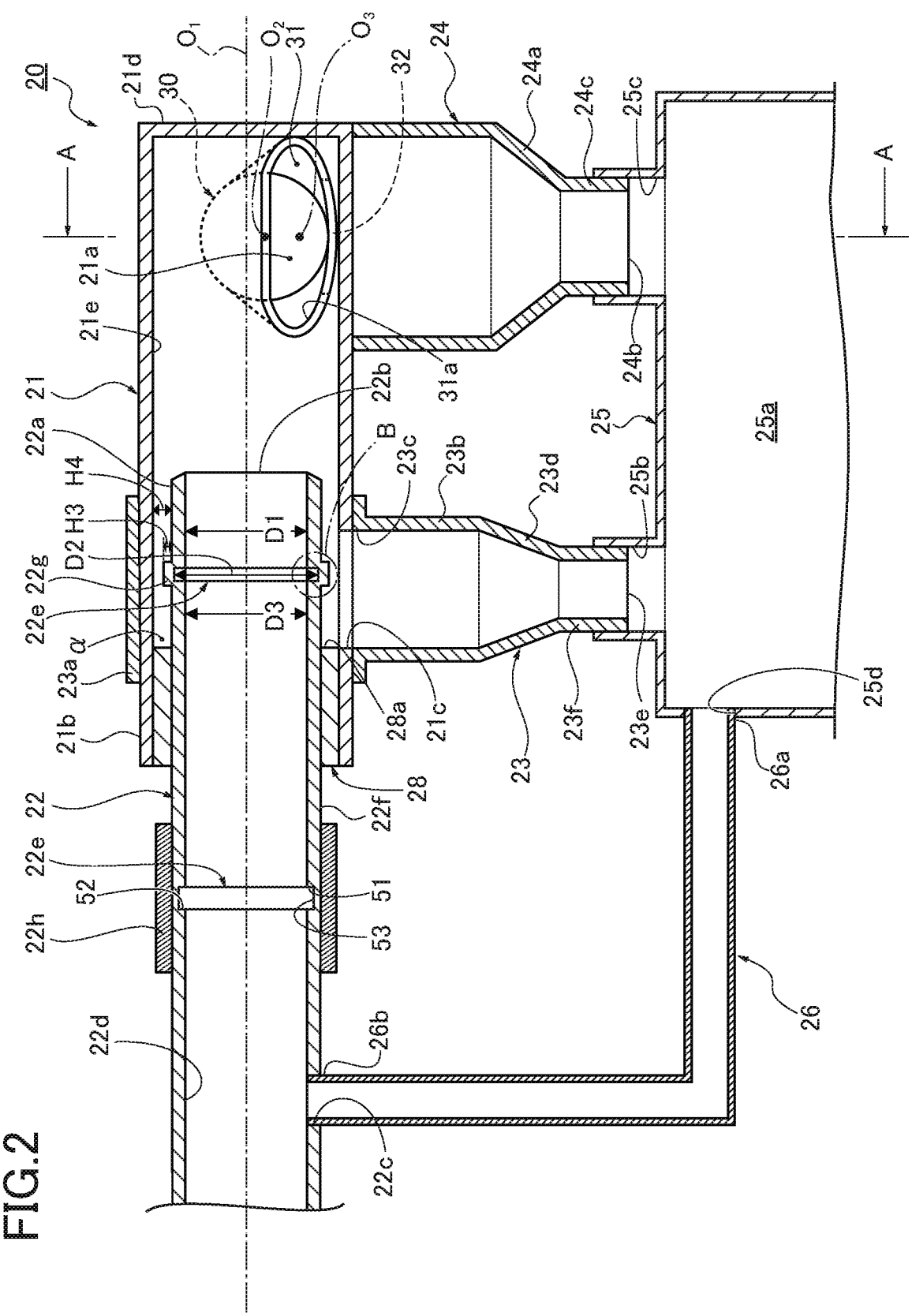
FIG. 2 is a cross-sectional view illustrating the gas-liquid separator according to the first embodiment.
Figure 3:
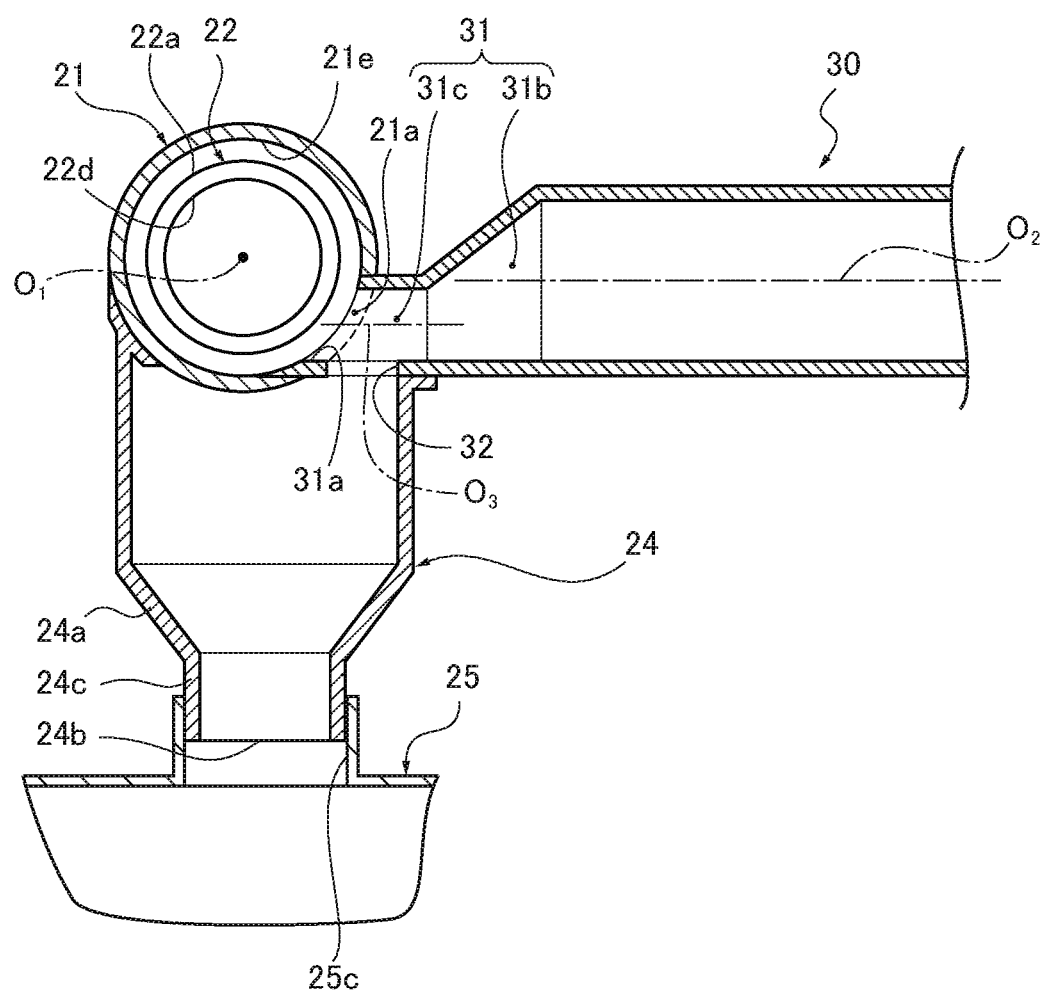
FIG. 3 is a cross-sectional view along an A-A line shown in FIG. 2.

(Configuration of Gas-Liquid Separator) FIGS. 2 and 3 are cross-sectional views illustrating the gas-liquid separator according to the first embodiment. Hereinafter, the configuration of the gas-liquid separator according to the first embodiment will be described in detail with reference to FIGS. 2 and 3.

As shown in FIG. 2, the gas-liquid separator 20 according to the first embodiment includes an inlet pipe 21, an inner pipe 22, a first drain pipe 23, a second drain pipe 24, a reservoir tank 25, a bypass pipe 26, and a fluid inflow pipe 30.

The inlet pipe 21 is a cylindrical tubular member in communication with the intake port 2a and the low-pressure EGR valve 14 via the fluid inflow pipe 30. The inlet pipe 21 receives an exhaust gas in the mixture of a gas and a particulate liquid (condensed water). This mixture is referred to as "the gas-liquid two-phase fluid" hereinafter. An axis line $O_1$ of the inlet pipe 21 horizontally extends. The gas-liquid two-phase fluid flows along the axis line $O_1$ within the inlet pipe 21. The inlet pipe 21 includes a fluid inlet 21a and a first drain port 21c (drain port). The fluid inlet 21a is formed on the circumferential surface of the inlet pipe 21 upstream (in the right side in FIG. 2) in the flow direction of the gas-liquid two-phase fluid. The first drain port 21c is formed at an end portion 21b of the inlet pipe 21 downstream (in the left side in FIG. 2) in the flow direction of the gas-liquid two-phase fluid. Hereinafter, the upstream and the downstream in the flow direction of the gas-liquid two-phase fluid are referred to as "the fluid entering side" and "the fluid exiting side", respectively. The inlet pipe 21 includes a closed end surface 21d in the fluid entering side.

The fluid inlet 21a of the inlet pipe 21 is an opening that opens tangentially relative to the inlet pipe 21. The fluid inlet 21a is formed at a position where the center of the opening (i.e. an axis line $O_3$) is offset vertically downward with respect to the axis line $O_1$ (see FIG. 3). As shown in FIG. 2, the fluid inlet 21a has a flat elliptical shape in which the dimension in the circumferential direction of the inlet pipe 21 is relatively short and the dimension along the axis line $O_1$ is relatively long. In other words, the fluid inlet 21a has a flat shape whose longitudinal axis is coaxial with the axis line $O_1$. Further, the cross-section area of the fluid inlet 21a in a cross section perpendicular to an axis line $O_2$ of the fluid inflow pipe 30 has the substantially same size as that of the fluid inflow pipe 30. It should be noted that "the vertical direction" is perpendicular to the horizontal direction and is a direction in which gravity acts. The top and bottom direction in the drawings in FIGS. 2 and 3 corresponds to "the vertical direction". It should also be noted that an axis line $O_2$ is an axis line of a primary portion of the fluid inflow pipe 30.

The first drain port 21c is an opening through which the liquid separated from the gas-liquid two-phase fluid exits the inlet pipe 21. The first drain port 21c is formed at the bottom of the inlet pipe 21 in the vertical direction (i.e. the radial direction of the inlet pipe 21).

The inner pipe 22 is a cylindrical tubular member which has an outer diameter smaller than the inner diameter of the inlet pipe 21. An end 22a of the inner pipe 22 is inserted into the end portion 21b at the fluid exiting side of the inlet pipe 21 so that the inner pipe 22 is disposed coaxially with the inlet pipe 21.

A spacer 28 is disposed within a gap or clearance a between the inlet pipe 21 and the inner pipe 22. The spacer 28 has a cylindrical shape to surround the entire circumference of the inner pipe 22. An outer circumferential surface of the spacer 28 contacts an inner circumferential surface 21e of the inlet pipe 21 in an airtight state. On the other hand, an inner circumferential surface of the spacer 28 contacts an outer circumferential surface 22f of the inner pipe 22 in an airtight state. The spacer 28 includes an axial end 28a within the inlet pipe 21. The axial position of the axial end 28a is coincident with that of a most downstream portion of a circumferential edge of the first drain port 21c. Specifically, the spacer 28 is provided not to overlap the opening area of the first drain port 21c and not to leave any gap or clearance in the axial direction between the spacer 28 and the opening area of the first drain port 21c.

The inner pipe 22 includes an opening 22b in the end 22a inserted into the inlet pipe 21. The opening 22b opens in the axial direction. The inlet pipe 21, the inner pipe 22 and the opening 22b are provided coaxially relative to each other. The end of the inner pipe 22 in the fluid exiting side (i.e. the left side in FIG. 2) is in communication with the compressor 5a of the turbocharger 5.

Further, the inner pipe 22 includes a vent hole 22c at a portion extending from the inlet pipe 21. The vent hole 22c radially extends through the circumferential surface of the inner pipe 22. To the vent hole 22c, a second end 26b of the bypass pipe 26 is connected. The inner pipe 22 further includes a plurality of circular grooves 22e (two in this embodiment) formed on an inner circumferential surface 22d. Also, the inner pipe 22 includes a protrusion 22g on the outer circumferential surface 22f of a portion of the inner pipe 22 inserted into the inlet pipe 21. An electrical heating sheet 22h (heating structure) is provided along the outer circumferential surface 22f of the portion of the inner pipe 22 extending from the inlet pipe 21.

Figure 4:
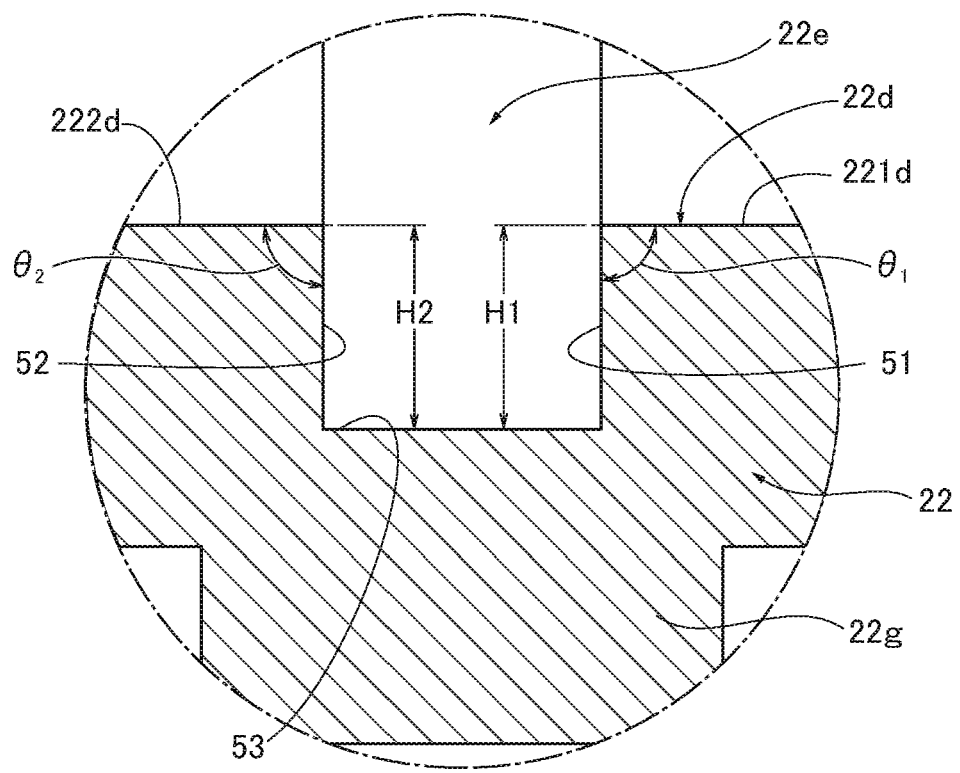
FIG. 4 is an enlarged view of a portion B shown in FIG. 2.

The circular grooves 22e formed in the inner pipe 22 are circular recesses circumferentially extending along the inner pipe 22. The circular grooves 22e are disposed axially inward of the inner pipe 22, i.e. at positions closer to the fluid exiting side than the fluid inflow pipe 30. In this embodiment, one of the two circular grooves 22e is disposed on the inner circumferential surface of the portion of the inner pipe 22 inserted into the inlet pipe 21. This circular groove 22e is formed inside the protrusion 22g so that the axial position of this circular groove 22e is coincident with that of the protrusion 22g. The other of the circular grooves 22e is disposed on the inner circumferential surface of the portion of the inner pipe 22 extending from the inlet pipe 21. As shown in the enlarged view of FIG. 4, each of the circular grooves 22e includes a first step surface 51, a second step surface 52 and a bottom surface 53.

The first step surface 51 is one of the surfaces defining the circular groove 22e and located in the fluid entering side. The first step surface 51 increases the inner diameter of the inner pipe 22 in a step-wise manner in the fluid exiting side. Specifically, an inner diameter D2 of the inner pipe 22 defined within the circular groove 22e is larger than an inner diameter D1 of the inner pipe 22 in the fluid entering side from the circular groove 22e. The first step surface 51 and an inner circumferential surface 221d of the inner pipe 22 which is located in the fluid entering side from the first step surface 51 define an angle $\theta 1$. In this embodiment, the angle $\theta 1$ is set to 90 degrees.

The second step surface 52 is another surface defining the circular groove 22e and located in the fluid exiting side. The second step surface 52 decreases the inner diameter of the inner pipe 22 in a step-wise manner in the fluid exiting side. Specifically, the inner diameter D2 of the inner pipe 22 defined within the circular groove 22e is larger than an inner diameter D3 of the inner pipe 22 in the fluid exiting side from the circular groove 22e. The second step surface 52 and an inner circumferential surface 222d of the inner pipe 22 which is located in the fluid exiting side from the second step surface 52 define an angle $\theta_2$. In this embodiment, the angle $\theta_2$ is set to 90 degrees. Further, a height H2 of the second step surface 52 has the same height as a height H1 of the first step surface 51.

The bottom surface 53 of the circular groove 22e is located between the first step surface 51 and the second step surface 52. The bottom surface 53 circumferentially extends along the inner pipe 22.

The protrusion 22g radially and circumferentially extends from the outer circumferential surface 22f of the inner pipe 22 to entirely surround the outer circumferential surface 22f. The protrusion 22g is formed above the first drain port 21c of the inlet pipe 21 in the direction of gravity. The protrusion 22g has a height H3. The clearance between the inner circumferential surface 21e of the inlet pipe 21 and the outer circumferential surface 22f of the inner pipe 22 has a height H4. The height H3 of the protrusion 22g is set to be smaller than the height H4 of the clearance. Thereby, a gap or clearance is formed between a tip surface of the protrusion 22g and the inner circumferential surface 21e of the inlet pipe 21.

The electrical heating sheet 22h is a flexible sheet including heating wires which generate heat when a switch (not shown) is turned on. The electrical heating sheet 22h is wound around the outer circumferential surface 22f of the inner pipe 22. The inner pipe 22 is heated when the heating wires of the electrical heating sheet 22h generates heat. In this embodiment, the electrical heating sheet 22h surrounds the portion of the inner pipe 22 extending from the inlet pipe 21 where the other circular groove 22e is provided. Accordingly, the electrical heating sheet 22h heats the portion of the outer circumferential surface 22f where the other circular groove 22e (the first step surface 51) is provided.

The first drain pipe 23 is a T-shaped pipe including a first pipe member 23a and a second pipe member 23b. The second pipe member 23b is connected to an axial center portion of the first pipe member 23a and perpendicular to the first pipe member 23a. A fluid exiting end of the inlet pipe 21 extends into the first pipe member 23a and is fixed thereto. A connection opening 23c is formed at a connection portion between the first pipe member 23a and the second pipe member 23b. The connection opening 23c is provided to face the first drain port 21c. Thereby, the inlet pipe 21 is in communication with the second pipe member 23b of the first drain pipe 23 via the drain port 21c and the connection opening 23c.

The inner diameter of the first drain port 21c formed in the inlet pipe 21 has the substantially same size as that of the connection opening 23c of the first drain pipe 23. The second pipe member 23b extends in the vertical direction and includes a tapered diameter portion 23d in the middle thereof. The diameter of the tapered diameter portion 23d becomes gradually smaller in the liquid flow direction. Accordingly, the inner diameter of a tip opening 23e is smaller than the inner diameters of the connection opening 23c and the first drain port 21c.

The second drain pipe 24 is a cylindrical tubular member extending in the vertical direction. An end of the second drain pipe 24 is fixed to an outer circumferential surface of the inlet pipe 21 in the fluid entering side and the fluid inflow pipe 30. As shown in FIG. 3, an end of the second drain pipe 24 is in communication with an upstream drain port 32 formed in the fluid inflow pipe 30. The second drain pipe 24 includes a tapered diameter portion 24a in the middle thereof. The diameter of the tapered diameter portion 24a becomes gradually smaller in the liquid flow direction. Accordingly, the cross-sectional area of a tip opening 24b is smaller than that of the upstream drain port 32.

The reservoir tank 25 includes a tank body 25a disposed below the first drain pipe 23 and the second drain pipe 24 in the vertical direction. The tank body 25a includes a first connection opening 25b and a second connection opening 25c formed at an upper portion of the tank body 25a. The first connection opening 25b is connected to a tip portion 23f of the second pipe member 23b of the first drain pipe 23. The second connection opening 25c is connected to a tip portion 24c of the second drain pipe 24. The second pipe member 23b includes the tip opening 23e formed in the tip portion 23f. The tip opening 23e is in communication with the first connection opening 25b. The second drain pipe 24 includes the tip opening 24b formed in the tip portion 24c. The tip opening 24b is in communication with the second connection opening 25c. The tank body 25a includes a vent hole 25d to which a first end 26a of the bypass pipe 26 is connected. The vent hole 25d is formed at a vertically upper portion of a side wall of the tank body 25a. The tank body 25a includes a drain opening (not shown) formed at a vertically lower portion thereof. The drain opening is configured to open and close. The liquid may be discharged from the tank body 25a via the drain opening when the liquid in the tank body 25a reaches a predetermined amount.

The bypass pipe 26 is a pipe member for connecting the inner pipe 22 and the reservoir tank 25. The bypass pipe 26 includes the first end 26a and the second end 26b which are opening ends. The first end 26a is connected to the vent hole 25d of the tank body 25a while the second end 26b is connected to the vent hole 22c of the inner pipe 22. Accordingly, the bypass pipe 26 communicates an inside of the tank body 25a with an inside of the inner pipe 22.

The fluid inflow pipe 30 is a cylindrical tubular member. The diameter of the fluid inflow pipe 30 is smaller than that of the inlet pipe 21. The end of the fluid inflow pipe 30 in the fluid entering side (i.e. the right side in FIG. 3) is in communication with the intake port 2a and the low-pressure EGR valve 14. The other end of the fluid inflow pipe 30 in the fluid exiting side (i.e. the left side in FIG. 3) includes a connecting portion 31. The fluid inflow pipe 30 is disposed so that the axis line $O_2$ horizontally extends and inclines relative to the axis line $O_1$ of the inlet pipe 21. In this embodiment, the axis line $O_2$ of the fluid inflow pipe 30 is perpendicular to the axis line $O_1$.

The connecting portion 31 is a portion that deforms the contour of the fluid inflow pipe 30 to be coincident with the opening of the fluid inlet 21a. The connecting portion 31 includes a connection opening 31a at a leading end which is inserted into the fluid inlet 21a and connected thereto. The connection opening 31a opens in the axial direction of the fluid inflow pipe 30 and is in communication with the fluid inlet 21a.

The connecting portion 31 according to the first embodiment further includes a first connecting portion 31b and a second connecting portion 31c. The first connecting portion 31b has a cross-sectional shape which gradually changes from an annular cross-sectional shape to a flat elliptical cross-sectional shape. The annular cross-sectional shape is the same as the cross-sectional shape of the primary portion of the fluid inflow pipe 30. The flat elliptical cross-sectional shape is the same as the cross-sectional shape of the fluid inlet 21a. Also, the second connecting portion 31c has a cross-sectional shape which is the same as that of the fluid inlet 21a. The cross-sectional area of the fluid inlet 21a in a cross section perpendicular to the axis line $O_2$ is the substantially same as that of the fluid inflow pipe 30. Accordingly, the cross-sectional area of the first connecting portion 31b is the substantially same as that of the second connecting portion 31c.

As shown in FIG. 3, in the connecting portion 31, the axis line $O_3$ extending along the center of the connection opening 31a is parallel to the axis line $O_2$ of the fluid inflow pipe 30 and the tangential direction of the inlet pipe 21. In addition, the axis line $O_3$ is offset vertically downward with respect to the axis line $O_1$ of the inlet pipe 21.

The second connecting portion 31c of the connecting portion 31 includes the upstream drain port 32 which opens vertically downward. The upstream drain port 32 opens above the second drain pipe 24 to be in communication with the second drain pipe 24.

Next, the operation of the gas-liquid separator 20 according to the first embodiment will be separately described under headings "Gas-Liquid Separation", "Liquid Collection", "Acceleration of Liquid Evaporation", and "Maintain of Droplets by Second Step Surface".

Figure 5:
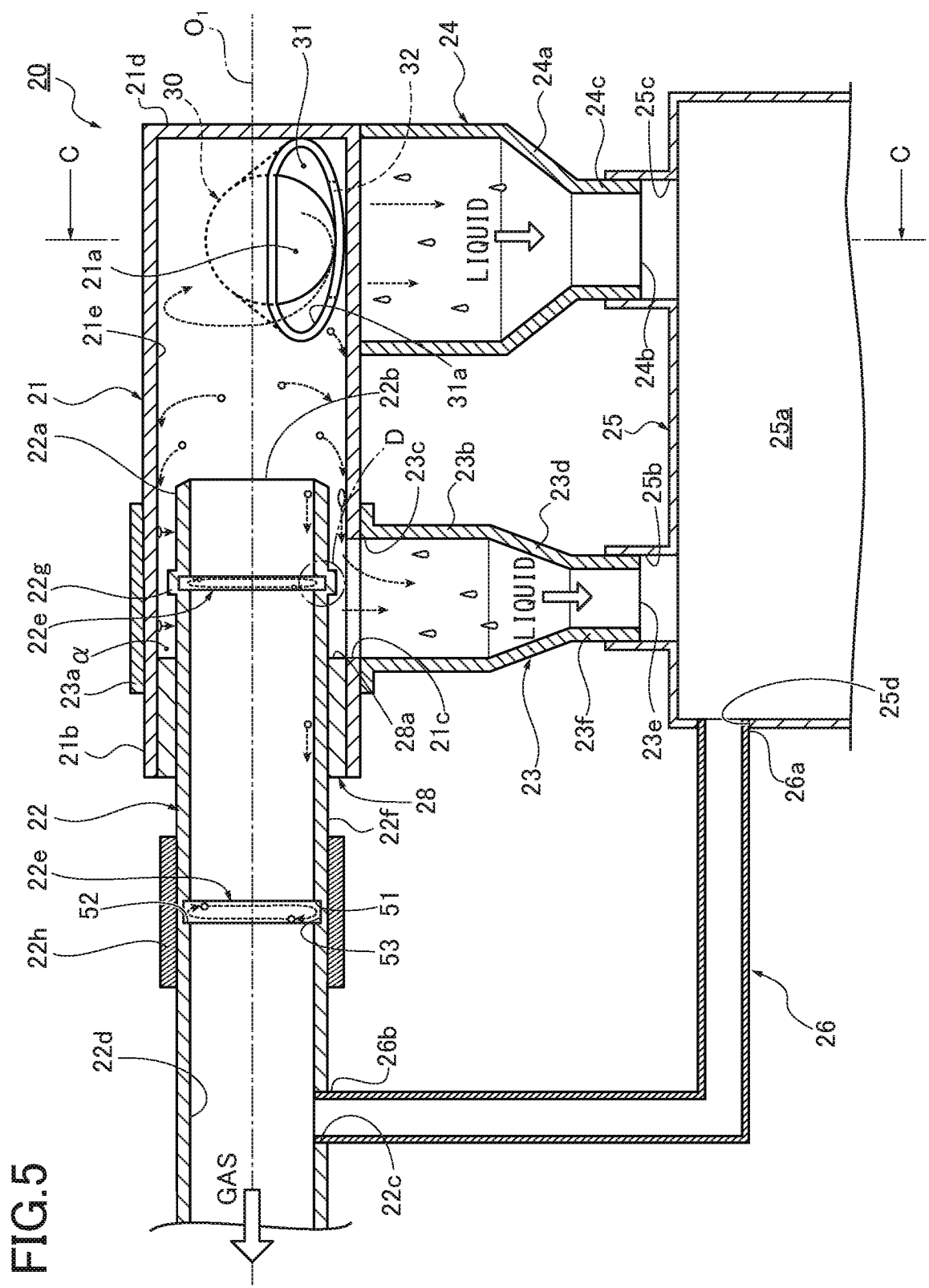
FIG. 5 is an overall explanatory view illustrating the flow of the gas-liquid two-phase fluid and the flows of the separated gas and liquid in the gas-liquid separator according to the first embodiment.
Figure 6:
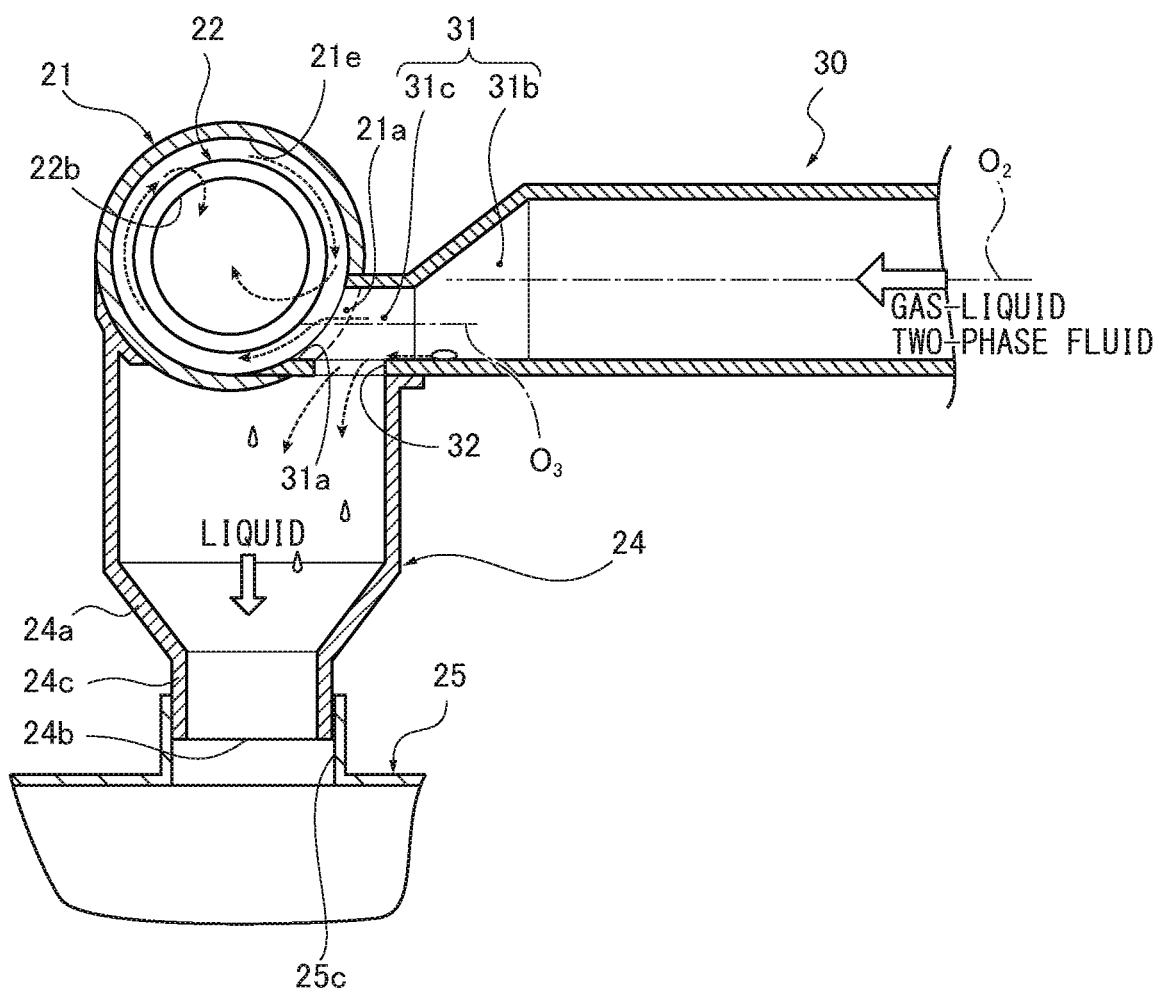
FIG. 6 is a cross-sectional view along a C-C line shown in FIG. 5.

(Gas-Liquid Separation) FIGS. 5 and 6 are explanatory views illustrating the flow of the gas-liquid two-phase fluid as well as the flows of the separated gas and liquid through the gas-liquid separator according to the first embodiment. Hereinafter, the gas-liquid separation in the first embodiment will be described with reference to FIGS. 5 and 6.

In the exhaust gas recirculation system S shown in FIG. 1, an outside air taken from the intake port 2a and the exhaust gas taken from the exhaust passage 3 via the low-pressure EGR passage 11 flow into the compressor 5a of the turbocharger 5 at a flow rate of 1 m/s to 100 m/s. At this time, the exhaust gas contains moisture. The exhaust gas is cooled in the EGR cooler 13 so that the moisture is condensed into the particulate liquid as condensed water, and the liquid is mixed with the gas such as air to form the gas-liquid two-phase fluid.

In the gas-liquid separator 20 according to the first embodiment shown in FIG. 5, the gas-liquid two-phase fluid flowing through the fluid inflow pipe 30 flows into the inlet pipe 21 through the connecting portion 31 of the fluid inflow pipe 30 and the fluid inlet 21a.

The axis line $O_2$ of the fluid inflow pipe 30 extends horizontally and perpendicular to the axis line $O_1$ of the inlet pipe 21. Accordingly, the gas-liquid separator 20 is configured so that the gas-liquid two-phase fluid is introduced into the inlet pipe 21 from the side thereof. In addition, the fluid inlet 21a of the inlet pipe 21 is disposed below the axis line $O_1$ at a position where the opening center of the fluid inlet 21a is offset from a position directly below the axis line $O_1$. On the other hand, in the fluid inflow pipe 30, the axis line $O_3$ extending through the center of the connection opening 31a of the connecting portion 31 is offset virtually downward with respect to the axis line $O_1$ of the inlet pipe 21.

Thereby, the gas-liquid two-phase fluid flows from the fluid inflow pipe 30 into the inlet pipe 21 toward a direction offset vertically downward of the center (the axis line $O_1$) of the inlet pipe 21 and then flows along the inner circumferential surface 21e. Consequently, the gas-liquid two-phase fluid is suppressed from flowing toward the center of the inlet pipe 21. The gas-liquid two-phase fluid flows toward the end portion 21b in the fluid exiting side while swirling along the inner circumferential surface 21e in the clockwise direction to be a swirling flow. As a result, the gas-liquid two-phase fluid properly swirls within the inlet pipe 21 in which the axis line $O_1$ horizontally extends.

The gas-liquid two-phase fluid flows into the inlet pipe 21 through the fluid inlet 21a. The cross-sectional area of the fluid inlet 21a in the cross section perpendicular to the axis line $O_2$ of the fluid inflow pipe 30 is substantially the same size as that of the fluid inflow pipe 30. In addition, the fluid inlet 21a has the flat elliptical shape in which the opening dimension along the axis line $O_1$ is longer. Thereby, the internal pressure of the connecting portion 31 is suppressed from increasing and accordingly the gas-liquid two-phase fluid smoothly flows. In addition, the offset amount of the axis line $O_3$ extending through the center of the connection opening 31a with respect to the axis line $O_1$ of the inlet pipe 21 is secured.

In other words, in the case that the diameter of the fluid inflow pipe 30 is sufficiently smaller than that of the inlet pipe 21, the axis line $O_3$ extending through the center of the connection opening 31a can be sufficiently moved with respect to the axis line $O_1$ of the inlet pipe 21 in the vertical direction even if the fluid inlet 21a does not have the flat shape. However, in the case that the diameter of the fluid inflow pipe 30 is substantially same as or larger than that of the inlet pipe 21 and the cross-sectional shape of the fluid inlet 21a is the same as that of the fluid inflow pipe 30, the axis line $O_3$ extending through the center of the connection opening 31a cannot be sufficiently offset with respect to the axis line $O_1$ of the inlet pipe 21. On the other hand, in the case that the fluid inlet 21a has the opening shape smaller than that of the fluid inflow pipe 30, the internal pressure of the connecting portion 31 increases and accordingly the flow of the gas-liquid two-phase fluid is suppressed.

In the embodiment, on the other hand, the fluid inlet 21a is formed to have the flat elliptical shape. Accordingly, the cross-sectional area of the fluid inlet 21a in the cross section perpendicular to the axis line $O_2$ of the fluid inflow pipe 30 can be set to have substantially the same size as that of the fluid inflow pipe 30. In addition, the axis line $O_3$ extending through the center of the connection opening 31a can be offset with respect to the axis line $O_1$ of the inlet pipe 21.

Further, the fluid inlet 21a has the flat shape in which the opening dimension is longer along the axis line $O_1$ of the inlet pipe 21. Accordingly, the opening dimension of the fluid inlet 21a is smaller in the circumferential direction of the inlet pipe 21, i.e. the swirling direction of the gas-liquid two-phase fluid. Thereby, the opening dimension of the fluid inlet 21a in the swirling direction can be smaller even when the fluid inlet 21a has the same cross-sectional area as that of a circular opening, for example. Accordingly, the gas-liquid two-phase fluid is suppressed from being diffused when flowing into the inlet pipe 21 through the fluid inlet 21a and guided to flow along the inner circumferential surface 21e of the inlet pipe 21. Consequently, the swirling force applied to the gas-liquid two-phase fluid can be improved.

The swirling flow of the gas-liquid two-phase fluid generates the centrifugal force within the inlet pipe 21. The centrifugal force guides the liquid toward the inner circumferential surface 21e of the inlet pipe 21 since the weight of the liquid is heavier than that of the gas.

The liquid guided toward the inner circumferential surface 21e of the inlet pipe 21 coheres to become droplets and is separated from the gas. The liquid separated from the gas flows downstream by the swirling flow while attached to the inner circumferential surface 21e. Then, the liquid flows into the second pipe member 23b through the first drain port 21c and the connection opening 23c of the first drain pipe 23, and flows along the second pipe member 23b. Subsequently, the liquid flows out of the second pipe member 23b through the tip opening 23e and flows into the tank body 25a to be retained therein.

The first drain port 21c opens vertically downward, and the second pipe member 23b of the first drain pipe 23 extends vertically. Accordingly, the liquid falls down toward the second pipe member 23b through the first drain port 21c by its own weight. Further, the outer diameter of the inner pipe 22 is smaller than the inner diameter of the inlet pipe 21 so that the liquid attached to the inner circumferential surface 21e of the inlet pipe 21 can be prevented from flowing into the inner pipe 22. Specifically, the liquid separated from the gas-liquid two-phase fluid flows into the clearance or space between the inlet pipe 21 and the inner pipe 22 to be prevented from flowing into the inner pipe 22. Moreover, the inner pipe 22 is inserted into the inlet pipe 21 so that it is not necessary to enlarge the diameter of the pipes and accordingly an installation space required for the gas-liquid separator 20 can be reduced.

In the first embodiment, the inner pipe 22 is in communication with the reservoir tank 25 via the bypass pipe 26. Accordingly, the flow of the gas through the inner pipe 22 generates a negative pressure in the reservoir tank 25 so that the liquid can smoothly flow through the first drain pipe 23.

In addition, the gas flowing through the inlet pipe 21 flows into the inner pipe 22 from the opening 22b which axially opens. At this time, the farther the liquid flows downstream in the flow direction of the gas-liquid two-phase fluid, the more the liquid is separated from the gas. Subsequently, the gas flows to the compressor 5a of the turbocharger 5 via the inner pipe 22. The spacer 28 is disposed in the end portion 21b of the inlet pipe 21 in the fluid exiting side to fill the clearance a between the inlet pipe 21 and the inner pipe 22. The spacer 28 prevents the gas from leaking from the clearance between the inlet pipe 21 and the inner pipe 22. Consequently, the gas separated from the gas-liquid two-phase fluid can smoothly flow into the inner pipe 22.

(Liquid Collection Operation) The fluid inflow pipe 30 of the gas-liquid separator 20 according to the first embodiment includes the connecting portion 31 and the connecting portion 31 includes the second connecting portion 31c. The upstream drain port 32 is formed in the bottom of the second connecting portion 31c to open vertically downward and in communication with the second drain pipe 24 extending in the vertical direction.

Accordingly, when the liquid contained in the gas-liquid two-phase fluid is relatively large and the droplets with the certain size have been generated, the liquid can flow out of the fluid inflow pipe 30 through the upstream drain port 32 by its own weight before entering the inlet pipe 21 as shown in FIG. 6. Then, the liquid flows through the second drain pipe 24, which is in communication with the upstream drain port 32, into the reservoir tank 25 to be retained therein.

A portion of the liquid contained in the gas-liquid two-phase fluid can be discharged through the upstream drain port 32 even when the flow velocity of the gas-liquid two-phase fluid is relatively low and the gas-liquid two-phase fluid can sufficiently swirl within the inlet pipe 21.

Therefore, in the gas-liquid separator 20 according to the first embodiment, a portion of the liquid contained in the gas-liquid two-phase fluid can be collected before entering the inlet pipe 21. Consequently, the liquid content in the gas-liquid two-phase fluid can be reduced and the liquid separation rate can be improved when the gas-liquid two-phase fluid is swirled.

Further, in the first embodiment, the axis line $O_3$ extending through the center of the connection opening 31a is offset vertically downward with respect to the axis line $O_1$ of the inlet pipe 21. Consequently, the liquid before entering the inlet pipe 21 can be easily discharged from the fluid inflow pipe 30 through the upstream drain port 32, and accordingly the liquid contained in the gas-liquid two-phase fluid can be effectively reduced.

Further, the liquid to become the droplets while flowing along the inner circumferential surface 21e of the inlet pipe 21 by the swirling flow falls into the first drain pipe 43 through the first drain port 21c by its own weight. Then, the liquid flows through the first drainpipe 23 into the reservoir tank 25 to be retained therein. However, smaller droplets which cannot fall down by their own weight may stay within the inlet pipe 21 while attached to the outer circumferential surface 22f of the inner pipe 22.

On the other hand, a portion of the gas contained in the gas-liquid two-phase fluid does not flow into the inner pipe 22 but flows into the clearance or space between the inlet pipe 21 and the inner pipe 22. However, the flow of the gas between the inlet pipe 21 and the inner pipe 22 is blocked by the spacer 28. Accordingly, the swirling flow of the gas along the inner circumferential surface 21e of the inlet pipe 21 collides with the spacer 28 and then flows backward along the outer circumferential surface 22f of the inner pipe 22 toward the opening 22b of the inner pipe 22.

Thereby, a portion of the droplets which cannot fall down by its own weight and is attached to the outer circumferential surface 22f of the inner pipe 22 may flow toward the opening 22b of the inner pipe 22 with the gas flowing toward the opening 22b.

In the gas-liquid separator 20 according to the first embodiment, on the other hand, the protrusion 22g extending circumferentially is provided on the portion of the outer circumferential surface 22f of the inner pipe 22 inserted into the inlet pipe 21 at a location facing the first drain port 21c.

Figure 7:
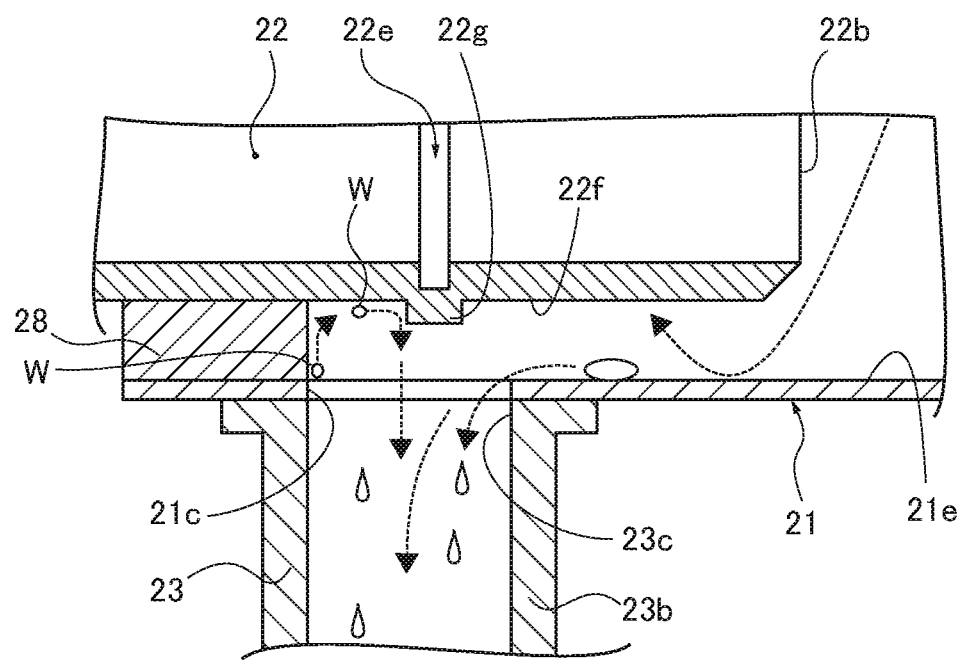
FIG. 7 is an enlarged view illustrating the flow of the liquid in the gas-liquid separator according to the first embodiment.

The gas which collides with the spacer 28 flows toward the opening 22b along the outer circumferential surface 22f of the inner pipe 22 to move the droplets W toward the opening 22b along the outer circumferential surface 22f. The protrusion 22g blocks the flow of the droplets W toward the opening 22b as shown in FIG. 7. Then, the droplets W blocked by the protrusion 22g are gathered and the gathered droplet fall down by its own weight into the first drain pipe 23 through the first drain port 21c when the weight of the gathered droplet becomes heavy enough to fall down.

Thereby, it is possible to prevent a portion of the droplets (liquid) from flowing into the inner pipe 22 and to appropriately collect the droplets even if the portion of the droplets attached to the outer circumferential surface 22f of the inner pipe 22 flows toward the opening 22b of the inner pipe 22 with the gas. Therefore, it is possible to prevent the liquid in the form of the droplets from being mixed with the gas flowing through the inner pipe 22.

(Acceleration of Liquid Evaporation) In the gas-liquid separator 20 according to the first embodiment, the gas separated from the liquid flows into the inner pipe 22 while keeping swirling and then flows to the turbocharger 5 (not shown). However, if the liquid which is not separated from the gas exists, such non-separated liquid may flow into the inner pipe 22 with the gas.

In the case where the liquid flown into the inner pipe 22 with the gas has turned to droplets having a certain weight, the liquid flowing downstream may collide with rotor blades of the compressor 5a of the turbocharger 5 to give an impact thereto.

On the other hand, in the gas-liquid separator 20 according to the first embodiment, the inner circumferential surface 22d of the inner pipe 22 includes a plurality of the circular grooves 22e (two in this embodiment) each including the first step surface 51, the second step surface 52, and the bottom surface 53.

The liquid flown into the inner pipe 22 is guided to the inner circumferential surface 22d by the swirling gas flowing through the inner pipe 22. Then, the liquid coheres. The liquid in the form of the droplets flows along the inner circumferential surface 22d and then flows into the circular grooves 22e.

Figure 8:
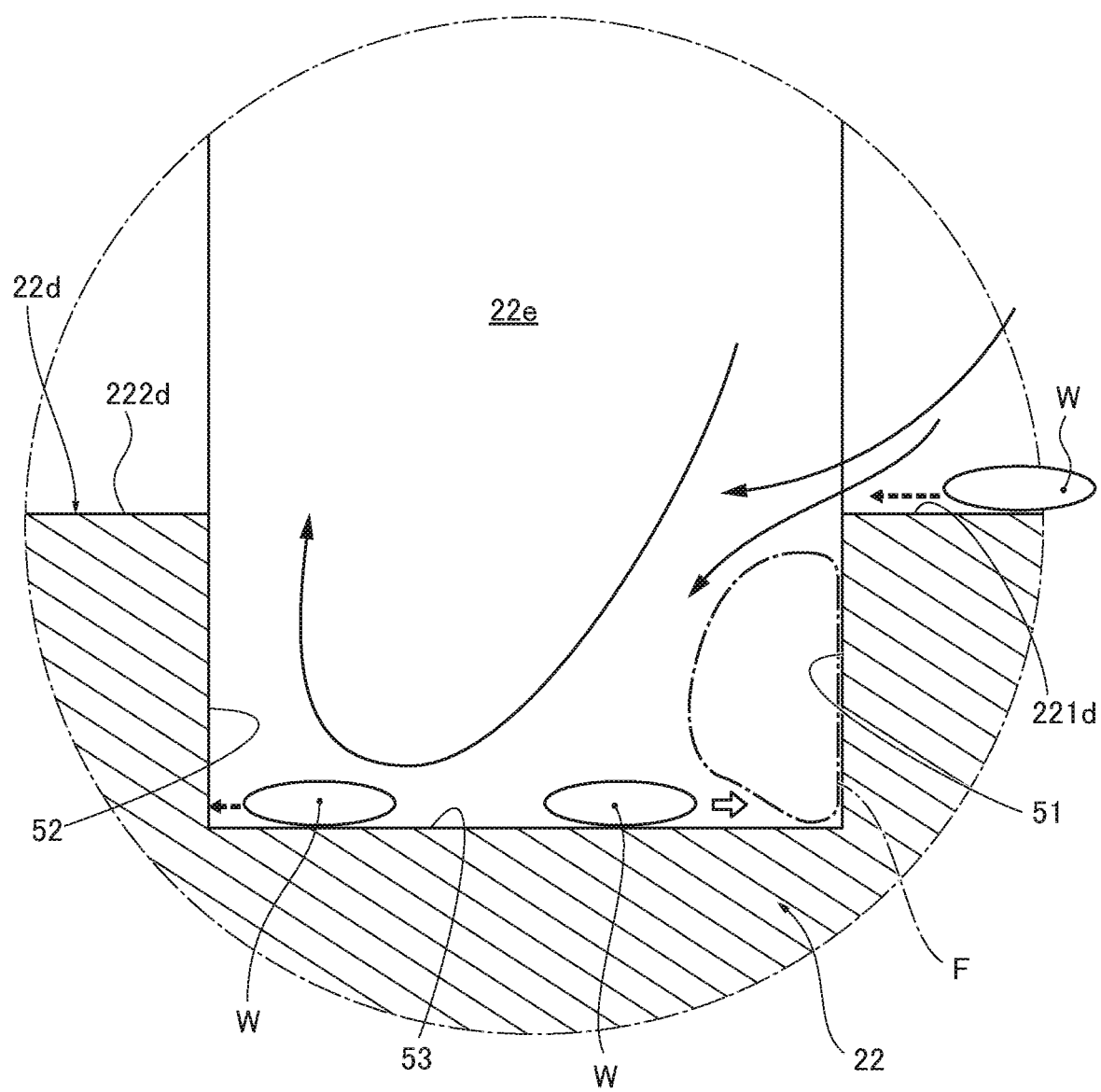
FIG. 8 is an enlarged view of a portion D shown in FIG. 5.

At this time, as shown in FIG. 8, the gas flowing into the circular groove 22e generates a turbulent flow within the circular groove 22e, which generates a negative pressure region F along the first step surface 51 located upstream in the flow direction of the gas-liquid two-phase fluid. Accordingly, the droplets W flown into the circular grooves 22e with the gas are pulled by the negative pressure toward the first step surface 51. Thereby, the droplets W remain within the circular groove 22e, specifically in the vicinity of the first step surface 51.

The bottom surface 53 of the circular groove 22e extends in the circumferential direction of the inner pipe 22. Accordingly, the swirling gas circumferentially flows along the bottom surface 53 within the circular groove 22e. In addition, the droplets W remained within the circular groove 22e also flows along the bottom surface 53 within the circular groove 22e with the swirling gas. In other words, the gas and the droplets W swirl along the bottom surface 53. Then, the droplets W keep swirling along the bottom surface 53 to evaporate.

The droplets W flown into the inner pipe 22 swirl within the circular groove 22e while pulled to the first step surface 51 and then evaporates. Accordingly, it is possible to prevent the droplets W from flowing through the inner pipe 22 with the gas.

As explained above, the liquid (the droplets W) separated from the gas swirls within the circular groove 22e while pulled to the first step surface 51 and then evaporates. Accordingly, it is possible to prevent the droplets W from flowing toward the fluid exiting side beyond the circular groove 22e.

Particularly, in the first embodiment, the inner circumferential surface 22d of the inner pipe 22 includes a plurality of the circular grooves 22e (two in this embodiment). Accordingly, there is a plurality of chances (twice in this embodiment) to keep the droplets W remained within the circular grooves 22e to evaporate the droplets W. Consequently, more liquid can be vaporized and accordingly the vaporization rate of the droplets can be improved.

Further, in the gas-liquid separator 20 according to the first embodiment, the electrical heating sheet 22h surrounds the portion of the outer circumferential surface 22f of the inner pipe 22 extending from the inlet pipe 21 as shown in FIG. 5. Therefore, the electrical heating sheet 22h can heat the outer circumferential surface 22f of the inner pipe 22 when turned on to generate heat.

Thereby, it is possible to increase the temperature in the portion of the inner pipe 22 extending from the inlet pipe 21 and to facilitate the liquid in the inner pipe 22 with the gas to evaporate. Accordingly, it is possible to evaporate and vaporize the droplets flown into the inner pipe 22 and to prevent the liquid in the form of the droplets from flowing downstream with the gas. Consequently, the vaporization rate of the droplets can be improved.

In the first embodiment, the circular groove 22e including the first step surface 51 is formed on the portion of the inner circumferential surface 22d of the inner pipe 22 extending from the inlet pipe 21 and surrounded by the electrical heating sheet 22h. Therefore, the portion of the outer circumferential surface 22f including the circular groove 22e can be heated by the electrical heating sheet 22h.

Therefore, it is possible to facilitate the evaporation of the droplets in the vicinity of the first step surface 51 of the circular groove 22e and to effectively evaporate the droplets flown into the inner pipe 22.

(Maintain of Droplets by Second Step Surface) In the first embodiment, each of the circular grooves 22e formed on the inner pipe 22 includes the second step surface 52. The second step surface 52 is provided closer to the fluid exiting side than the first step surface 51 is. The second step surface 52 decreases the inner diameter of the inner pipe 22 in a step-wise manner in the fluid exiting side.

Therefore, as shown in FIG. 8, even if the droplets W flown into the circular groove 22e move away from the first step surface 51 toward the fluid exiting side by the swirling flow, the second step surface 52 can prevent the movement of the droplets W and keep the droplets remained within the circular groove 22e. In other words, the second step surface 52 can prevent the droplets W from flowing downstream of the circular groove 22e. Consequently, the droplets W is kept remained within the circular groove 22e to be evaporated and accordingly the liquid in the form of the droplets W can be suppressed from flowing downward.

Although the gas-liquid separator of the present disclosure has been described based on the first embodiment, the specific configuration of the gas-liquid separator is not limited to the embodiment, and modifications and/or additions of the configuration may be made without departing from the gist of the inventions recited in the claims.

In the first embodiment, the fluid inlet 21a has the flat elliptical shape in which the opening dimension is longer along the axis line $O_1$ of the inlet pipe 21. However, the opening dimension of the fluid inlet 21a is not limited to the one in the first embodiment as long as the axis line $O_3$ extending through the center of the connection opening 31a of the fluid inflow pipe 30 is vertically offset with respect to the axis line $O_1$. Particularly, the fluid inlet 21a may have a cross-sectional shape the same as that of the fluid inflow pipe 30 if the diameter dimension of the fluid inflow pipe 30 is sufficiently smaller than that of the inlet pipe 21.

Further, in the first embodiment, the axis line $O_3$ extending through the center of the connection opening 31a of the fluid inflow pipe 30 is offset vertically downward with respect to the axis line $O_1$. However, the axis line $O_3$ extending through the center of the connection opening 31a may be offset vertically upward with respect to the axis line $O_1$.

Also, in the first embodiment, the first drain pipe 23 connected to the first drain port 21c and the second drain pipe 24 connected to the upstream drain port 32 are connected to the reservoir tank 25. However, it is not necessary to dispose the first drain pipe 23, the second drain pipe 24, and the reservoir tank 25. Specifically, the liquid from the fluid inflow pipe 30 and the inlet pipe 21 may be directly discharged without retained in the reservoir tank. The number of the reservoir tank is not limited to one and may be provided for each of the drain pipes. Alternatively, one of the drain pipes may be connected to the reservoir tank. In other words, the reservoir tank may be arbitrarily provided. In addition, it is not necessary to dispose the upstream drain port 32 and the bypass pipe 26.

Further, in the first embodiment, the spacer 28 is separately formed from the inlet pipe 21 and the inner pipe 22. However, the spacer 28 may be integrally formed with the inner circumferential surface 21e of the inlet pipe 21 or the outer circumferential surface 22f of the inner pipe 22.

Moreover, in the gas-liquid separator 20 according to the first embodiment, the circular grooves 22e are formed on the inner circumferential surface 22d of the inner pipe 22, and each of the circular grooves 22e includes the first step surface 51 and the second step surface 52. However, the inner circumferential surface 22d of the inner pipe 22 may include only the first step surface 51 which increases the inner diameter of the inner pipe 22 in a stepwise manner in the fluid exiting side. Also, in this case, the negative pressure region can be generated along the first step surface 51 so that the liquid in the form of the droplets can remain in the vicinity of the first step surface 51 and circumferentially swirl to evaporate.

Further, in the case that only the first step surface is provided, a plurality of first step surfaces may be provided along the flow direction of the gas-liquid two-phase fluid. Specifically, the inner diameter of the inner pipe 22 may intermittently increase in a stepwise manner at a plurality of locations. In this case, it is possible to evaporate the droplets a plurality of times and to improve the vaporization rate of the droplets since the liquid may remain in the vicinity of the first step surfaces at the plurality of locations to evaporate.

Further, in the first embodiment, the angle $\theta_1$ is defined by the first step surface 51 formed in the inner pipe 22 and the inner circumferential surface 221d of the inner pipe located in the fluid entering side of the first step surface 51 and the angle $\theta_1$ is set to 90 degrees. However, the angle $\theta_1$ may be set to any angle as long as the angle can generate the negative pressure region F along the first step surface 51. Specifically, the angle $\theta_1$ may be an acute angle set to be equal to or lower than 90 degrees.

Further, in the gas-liquid separator 20 according to the first embodiment, the angle $\theta_2$ is defined by the second step surface 52 formed in the inner pipe 22 and the inner circumferential surface 222d of the inner pipe located in the fluid exiting side of the second step surface 52, and the angle $\theta_2$ is set to 90 degrees. However, the angle $\theta_2$ may be set to any angle as long as the angle can prevent the droplets in the circular groove 22e from moving downstream along the second step surface 52. Specifically, the angle $\theta_2$ may be an acute angle set to be equal to or lower than 90 degrees.

Moreover, in the first embodiment, the axial position of one of the circular grooves 22e formed on the inner circumferential surface 22d of the inner pipe 22 is coincident with the axial position of the protrusion 22g formed on the outer circumferential surface 22f of the inner pipe 22. Accordingly, it is possible to simultaneously form the circular groove 22e and the protrusion 22g by protruding a portion of the inner pipe 22 in which the inner circumferential surface 22d is recessed. Consequently, it is possible to prevent the reduction of the wall thickness of the inner pipe 22 due to the formation of the circular groove 22e. However, the axial positions of the circular grooves 22e and the protrusion 22g are not limited to the above, and the axial position of the circular grooves 22e may not be coincident with the axial position of the protrusion 22g.

Further, in the first embodiment, the flexible electrical heating sheet 22h is used as the heater for heating the outer circumferential surface 22f of the inner pipe 22, but the heater is not limited to the above. For example, the inner pipe may be formed in a double pipe structure having two pipe walls to circulate high-temperature exhaust gas between the two pipe walls to heat the inner pipe as long as the portion of the inner pipe 22 extending from the inlet pipe 21 can be heated. In other words, the circulation structure for the exhaust gas may be used as a heater.

In addition, the gas-liquid separator 20 according to the first embodiment is disposed at the location downstream of the low-pressure EGR valve 14 and upstream of the compressor 5a of the turbocharger 5 (i.e. at the location surrounded with a dashed line X in FIG. 1) in the exhaust gas recirculation system S. However, the location of the gas-liquid separator 20 is not limited to the above. The gas-liquid separator 20 may be disposed at a location where condensed water is produced in the exhaust gas recirculation system S. Accordingly, the gas-liquid separator 20 may be disposed at a location downstream of the intercooler 6 and upstream of the cylinder intake ports of the internal combustion engine 1 (i.e. at the location surrounded with a dashed line Y in FIG. 1).

Moreover, in the first embodiment, the internal combustion engine 1 is the diesel engine mounted in the vehicle. However, the internal combustion engine 1 is not limited to the diesel engine but may be a gasoline engine.

Further, in the first embodiment, the gas-liquid separator 20 is applied to the exhaust gas recirculation system S of the internal combustion engine 1. However, the gas-liquid separator is not limited to the above and may be applied to a refrigeration cycle device, for example, to separate a gaseous refrigerant and a liquid refrigerant. In other words, the gas-liquid separator of the present disclosure may be applied to devices which separate the liquid and the gas from the gas-liquid two-phase fluid.

Moreover, the positions of the connection, the shape and the diameter of each pipe (the inlet pipe, etc.) are not limited to ones in the first embodiment but may be selected as desired.

The invention claimed is:

1. A gas-liquid separator for separating a liquid and a gas from a gas-liquid two-phase fluid by swirling the gas-liquid two-phase fluid, the gas-liquid separator comprising:
   a cylindrical inlet pipe horizontally extending and comprising:
      a fluid inlet formed on a circumference surface upstream in a flow direction of the gas-liquid two-phase fluid; and
      a drain port formed at an end portion downstream in the flow direction of the gas-liquid two-phase fluid, the liquid exiting through the drain port;
   an inner pipe comprising an opening formed at an end, the end of the inner pipe inserted into the end portion of the inlet pipe downstream in the flow direction of the gas-liquid two-phase fluid and the inner pipe being coaxial with the inlet pipe; and
   a fluid inflow pipe horizontally extending and comprising a connecting portion connected to the fluid inlet at an end thereof, the fluid inflow pipe configured to supply the gas-liquid two-phase fluid into the inlet pipe through the fluid inlet from a side of the inlet pipe,
   wherein the connecting portion comprises a connection opening in communication with the fluid inlet, and
   wherein a position of an axis line extending through a center of the connection opening is vertically offset with respect to a position of an axis line of the inlet pipe.

2. The gas-liquid separator according to claim 1, wherein the position of the axis line extending through the center of the connection opening is offset vertically downward with respect to the position of the axis line of the inlet pipe.

3. The gas-liquid separator according to claim 1, wherein the fluid inlet has a flat shape whose dimension is longer along an axis line of the inlet pipe, and wherein a cross-sectional area of the fluid inlet in a cross section perpendicular to an axis line of the fluid inflow pipe is substantially the same size as that of the fluid inflow pipe.

4. The gas-liquid separator according to claim 1, wherein the connecting portion of the fluid inflow pipe comprises an upstream drain port that opens vertically downward.

5. The gas-liquid separator according to claim 1, further comprising:
   a drain pipe connected to the drain port of the inlet pipe;
   a reservoir tank connected to a tip portion of the drain pipe; and
   a bypass pipe connected to the inner pipe and the reservoir tank.

6. The gas-liquid separator according to claim 1, wherein the inner pipe comprises a first step surface on an inner circumferential surface thereof, and an inner diameter of the first step surface increases toward downstream in a flow direction of the gas-liquid two-phase fluid.

7. The gas-liquid separator according to claim 6, wherein the inner pipe further comprises a second step surface on the inner circumferential surface downstream of the first step surface in the flow direction of the gas-liquid two-phase fluid, and
wherein an inner diameter of the second step surface decreases toward downstream in the flow direction of the gas-liquid two-phase fluid.

8. The gas-liquid separator according to claim 1, wherein the inner pipe comprises a protrusion on an outer circumferential surface of a portion of the inner pipe inserted into the inlet pipe and the protrusion extends in a circumferential direction of the inner pipe.

9. The gas-liquid separator according to claim 1, wherein the inner pipe comprises a heating structure configured to heat a portion of the inner pipe extending from the inlet pipe.

* * * * *